J. J. KELLEHER.
WIRELESS CHECK ROW MECHANISM FOR PLANTERS.
APPLICATION FILED MAR. 1, 1915.
1,175,637.
Patented Mar. 14, 1916.
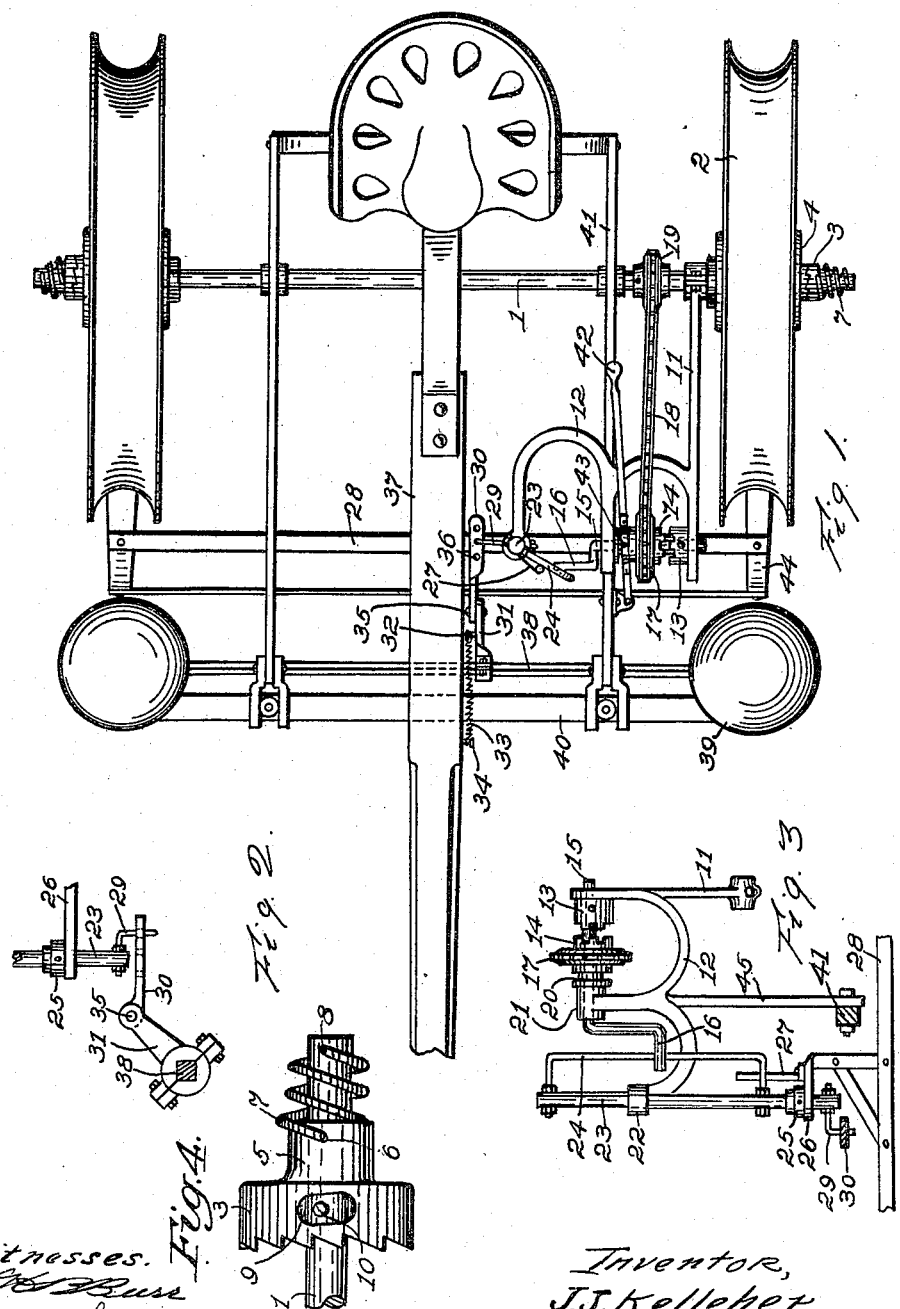

UNITED STATES PATENT OFFICE.

JOSEPH J. KELLEHER, OF ELKADER, IOWA.

WIRELESS CHECK-ROW MECHANISM FOR PLANTERS.

1,175,637. Specification of Letters Patent. Patented Mar. 14, 1916.

Application filed March 1, 1915. Serial No. 11,161.

*To all whom it may concern:*

Be it known that I, JOSEPH J. KELLEHER, a citizen of the United States of America, and a resident of Elkader, Clayton county, Iowa, have invented certain new and useful Improvements in Wireless Check-Row Mechanism for Planters, of which the following is a specification.

My invention relates to improvements in planters, and the object of my improvement is to provide a check-rower mechanism for a corn planter, automatically actuated by the carrying-wheels of the latter, and adapted to dispense entirely with a check-row wire.

This object I have accomplished by the means which are hereinafter described and claimed, and which are illustrated in the accompanying drawings, in which:

Figure 1 is a top plan view of a planter including my improved check-row mechanism. Fig. 2 is a detail view showing the movable connections between the two rock shafts. Fig. 3 is another detail view showing the sprocket wheel clutch and the oscillatory rock shaft. Fig. 4 is an enlarged detail view of one of the carrying-wheel clutches.

Similar numerals of reference denote corresponding parts throughout the several views.

The planter-frame 40—41 is pivotally mounted on the axle 1. Said axle has rotatable carrying wheels 2 on its opposite ends. The outer ends of the hubs have clutch faces.

The numeral 3 denotes a clutch-sleeve having a counterpart clutch-face of the ratchet type. Two of these sleeves are used in mesh with the clutch-faces on said hubs, and being both slidably and rotatably mounted on the outer ends of the axle 1. However, I have adopted the following means for limiting both the rotary and slidable movements of each sleeve. This consists in a pin 10 projected from the axle 1 into a transverse slot 9 in the sleeve 3. Each sleeve has an outwardly directed diminished portion 5 provided with a socket opening 6 to receive one inwardly bent end of the torsion spring 7, the latter being coiled about said axle and having its outer inturned end seated in the socket opening 8.

The numeral 11 denotes an arm, the lower end of which is pivotally mounted on the axle 1 and the upper end of which is integral with parts 12 extending to one side thereof and forming spaced apart arms, provided with alined bearings 21 adapted to receive a short rotary shaft 15, one end of which is formed into a crank 16.

The numeral 13 denotes a fixed sleeve on the shaft 15, provided with a clutch-face on its inner end.

The numeral 14 denotes a clutch sleeve both slidably and rotatably mounted on the shaft 15 and having a clutch face the counter part of and adapted to intermesh with the sleeve 13.

17 is a sprocket wheel fixed on the sleeve 14, and 20 is an annular groove in said sleeve adapted to movably receive a pin 43 projected thereinto from a lever 42, one end of which is pivoted on a side-bar 41 of the planter frame.

The numeral 23 denotes a vertically disposed rock shaft mounted slidably in the bearing 22 on the frame part 12, and having secured thereto a spaced apart parallel rod 24. The said rod lies in the path of rotatory movement of the crank 16 which latter thus rocks the shaft 23 to and fro by said means. The lower end of the shaft 23 has a collar 25 secured thereon, and resting upon the top of the bent upright 26, said shaft passing slidably through an opening in said upright. The lower end of said upright is secured fixedly to a runner-frame cross-bar 28, and the ends of the latter are secured to the furrow openers 44.

The numeral 29 denotes a downwardly bent arm secured to the lower end of the shaft 23, and having its downwardly bent end pivoted in an opening in a link connection 30 which has a plurality of such openings for adjusting purposes. One end of said link is pivotally connected at 35 to a crank 31 secured upon a rock shaft 38. The ends of said shaft are operatively connected to the actuating mechanisms of the seed droppers located underneath the seed receptacles 39 but not here shown.

The numeral 33 denotes a small coiled spring connected between the pins 32 and 34 located respectively on the crank 31 and the tongue 37.

The numeral 45 denotes a fixed arm on the frame part 12 and whose lower end is pivotally connected to the frame part 41.

A sprocket chain 18 is mounted upon the sprocket wheel 17 and upon a sprocket wheel 19 fixed on said axle 1.

The operation of the said device is as follows: When the clutch part 14 has been shifted into engagement with the clutch part 13 by the use of the hand lever 42, the crank 16 is put into rotation to rock the rod 24 and the shaft 23. Said shaft 23 by means of the arm 29, link 30 and crank 31, rocks the transverse shaft 38 to and fro and thus actuates the seed dropping mechanism at regular intervals thus dispensing with the means for any check-wire.

Referring to Fig. 4, it will be seen that in case one of the carrying-wheels 2 should mount a small hillock or other obstruction while the other wheel is traveling over more level ground, the mounting wheel will move farther than the other wheel is rotating, and would, ordinarily, irregularly effect the action of the seed dropping mechanisms. The mounting wheel will tend to bring its adjacent spring 7 under torsional strain in turning the clutch sleeve 3 while ascending the obstruction. Upon passing downwardly from said obstruction, the wheel will be caused to move more rapidly, due to reaction of the spring 7. The net result will be to prevent either wheel from creating any irregularity of action in the seed dropping devices through the medium of my improved actuating means.

Attention is particularly called to the manner of mounting said actuating mechanism relative to said axle and said frame. It will be seen that the connections to the frame are movable and that the parts of the mechanism are not in any way effected by means of relative movements of the frame. It will be seen, also, that the action of said mechanism is not affected by any oscillations of the runner-frame furrow-opener 44, since the shaft 23 is slidably connected to the frame member 12 and may oscillate up and down with said runner-frame while said mechanism is performing its ordinary functions regularly. The crank 16 will contact with and rock the rod 24 to and fro although said rod may have moved up or down relative thereto in accompanying the movements of said runner-frame. The actuating mechanism, therefore, is never affected by any vibrations or oscillations of the planter, but is entirely automatic in its operation.

Having thus described my invention, what I claim as new, and desire to secure by Letters Patent, is:

1. In a planter containing seed-dropping mechanism, a rock-shaft operatively connected to said mechanism, a rotatable axle, carrying-wheels rotatably non-slidably mounted thereon and having ratchet clutch-faces on their hubs, clutch-sleeves rotatably slidably mounted on the axle and in mesh with the clutch-faces on said hubs, torsion springs connected between said clutch-sleeves and said axle, and means separably connected between said axle and said rock-shaft adapted to rock the latter to and fro.

2. In a planter containing a main frame, an axle rotatable therein, and seed-dropping mechanism mounted on a runner-frame, a rock-shaft operatively connected to said mechanism, and means movably connected to said rock-shaft adapted to actuate it and said mechanism, said means being pivotally mounted on said axle and main frame and movably connected to the runner-frame.

3. In a planter containing seed-dropping mechanism mounted on a runner-frame, a rock-shaft operatively connected to said mechanism, a rotatable axle, and operative connecting means between said axle and said shaft adapted to rock the latter to and fro, said means including a sliding connection to said runner-frame.

4. In a planter, containing seed-dropping mechanism, a rock-shaft operatively connected to said mechanism, a rotatable axle, carrying-wheels rotatably non-slidably mounted on the ends of said axle and each having a ratchet clutch-face on one end of its hub, clutch-sleeves rotatably slidably mounted on said axle and intermeshing with said hub clutch-faces, said sleeves having transverse slots and pins fixed on said axle and extending into said slots, the slots being of dimensions to permit both limited longitudinal movement to the sleeve and also limited rotational movement thereof, and separable transmission mechanism operatively connected between said axle and said rock-shaft.

5. In a planter containing seed-dropping mechanism including a runner-frame, a rock-shaft operatively connected to said mechanisms, a rotatable axle, means connected operatively between said axle and said rock-shaft and adapted to rock the latter to and fro to actuate said seed-dropping mechanism at determined intervals, said means comprising an arm pivotally mounted on said axle and containing bearings, a shaft rotatably seated in said bearing and having one end formed into a crank, a clutch-member fixed on said shaft, a counterpart clutch-sleeve both rotatable and slidable on said shaft and adapted to mate with said clutch-member, a sprocket-wheel fixedly mounted on said clutch-sleeve, a sprocket-wheel fixedly mounted on said axle, a sprocket-chain operatively connecting said sprocket-wheels, a reciprocatory rock-shaft mounted in said pivoted arm and having a spaced parallel bar connected thereto, the latter lying within the path of rotation of said crank, said rock-shaft having a slidable connection to said runner-frame, a crank fixed on the first-mentioned rock-shaft, a link pivoted to said crank, and an arm projecting laterally from the second-mentioned rock-shaft and adjustably pivoted to said link.

Signed at Waterloo, Iowa, this 13th day of Feb. 1915.

JOSEPH J. KELLEHER.

Witnesses:
  W. H. BRUNN,
  G. C. KENNEDY.

Copies of this patent may be obtained for five cents each, by addressing the "Commissioner of Patents, Washington, D. C."